(12) United States Patent
Simpson et al.

(10) Patent No.: US 7,801,065 B2
(45) Date of Patent: Sep. 21, 2010

(54) RECEPTION TIMING METHOD AND APPARATUS

(75) Inventors: Floyd D. Simpson, Lake Worth, FL (US); Brian K. Smith, Wellington, FL (US); Huai Y. Wang, Greenacres, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 464 days.

(21) Appl. No.: 10/721,444

(22) Filed: Nov. 25, 2003

(65) Prior Publication Data

US 2005/0124313 A1 Jun. 9, 2005

(51) Int. Cl.
*G08C 17/00* (2006.01)

(52) U.S. Cl. .................. 370/311; 370/318; 455/574; 455/434

(58) Field of Classification Search ............. 455/422.1, 455/426.1, 426.2, 343.3, 434, 574, 127.5; 370/338, 311, 318, 329
See application file for complete search history.

(56) References Cited

U.S. PATENT DOCUMENTS

| | | | | |
|---|---|---|---|---|
| 6,084,869 | A * | 7/2000 | Fishman et al. .............. 370/348 |
| 6,192,230 | B1 * | 2/2001 | van Bokhorst et al. ... 455/343.3 |
| 7,245,946 | B2 * | 7/2007 | Liu ............................ 455/574 |
| 2003/0203740 | A1 * | 10/2003 | Bahl et al. .................. 455/516 |
| 2004/0013135 | A1 * | 1/2004 | Haddad ...................... 370/493 |
| 2004/0190467 | A1 * | 9/2004 | Liu et al. .................... 370/311 |
| 2004/0253996 | A1 * | 12/2004 | Chen et al. .................. 455/574 |
| 2004/0264397 | A1 * | 12/2004 | Benveniste .................. 370/311 |
| 2005/0018624 | A1 * | 1/2005 | Meier et al. ................. 370/318 |

OTHER PUBLICATIONS

Mathilde Benveniste, Keith Amann, and Bob Meier; "Proposed Normative Text for simplified APSD"; IEEE 802.11-03/107r0; Jan. 14, 2003; 4 pages.

IEEE 802 Committee of the IEEE Computer Society; "Draft Supplement to Standard for Telecommunications and Information Exchange Between Systems—LAN/MAN Specific Requirements—Part 11: Wireless Medium Access Control (MAC) and Physical Layer (PHY) specifications: Medium Access Control (MAC) Enhancements for Quality of Service (QoS)"; IEEE Std 802.11e/D4.0, Nov. 2002; 144 pages.

* cited by examiner

*Primary Examiner*—Vincent P Harper
*Assistant Examiner*—Dung Lam
(74) *Attorney, Agent, or Firm*—Fitch, Even, Tabin & Flannery; Larry G. Brown; Sylvia Chen

(57) ABSTRACT

An access point utilizes information (11) as provided by various subscriber units to provide a message (12) (as included with, for example, a beacon transmission) that reflects near term likely utilization of a shared communication resource. A subscriber unit (20) can then utilize that information to schedule its own monitoring activity. This, in turn, permits the subscriber unit to similarly schedule power saving activities to accommodate this reception schedule.

5 Claims, 2 Drawing Sheets

RECEPTION TIMING METHOD AND APPARATUS

TECHNICAL FIELD

This invention relates generally to communications and more particularly to reception activity when using a shared wireless communications resource.

BACKGROUND

Various communications protocols and schemes are known in the art. In some known systems, the reception activities of a given communication unit (such as a portable user device) are controlled in a manner that facilitates the use of one or more power saving modes of operation. For example, the well known 802.11 specification for a wireless local area network includes a proposed 802.11e specification that permits a mobile station to be able to signal an access point to indicate a time when the mobile station plans to emerge from a sleep mode of operation to enable receiving any pending traffic that the access point may have previously buffered for such mobile station. Because various mobile stations may unknowingly schedule such a listening time in an overlapping fashion with one another, the 802.11e specification permits a scheduler at the access point location to reschedule at least some such indicated times to thereby avoid the likelihood of such collisions.

Such an approach may provide satisfactory results under at least some operating circumstances but does not address all potential needs. In particular, the centralized approach embraced by this proposed 802.11e specification may require, at least under some operating circumstances, various resources beyond that which may be available to a given access point.

BRIEF DESCRIPTION OF THE DRAWINGS

The above needs are at least partially met through provision of the reception timing method and apparatus described in the following detailed description, particularly when studied in conjunction with the drawings, wherein.

Figure 1:
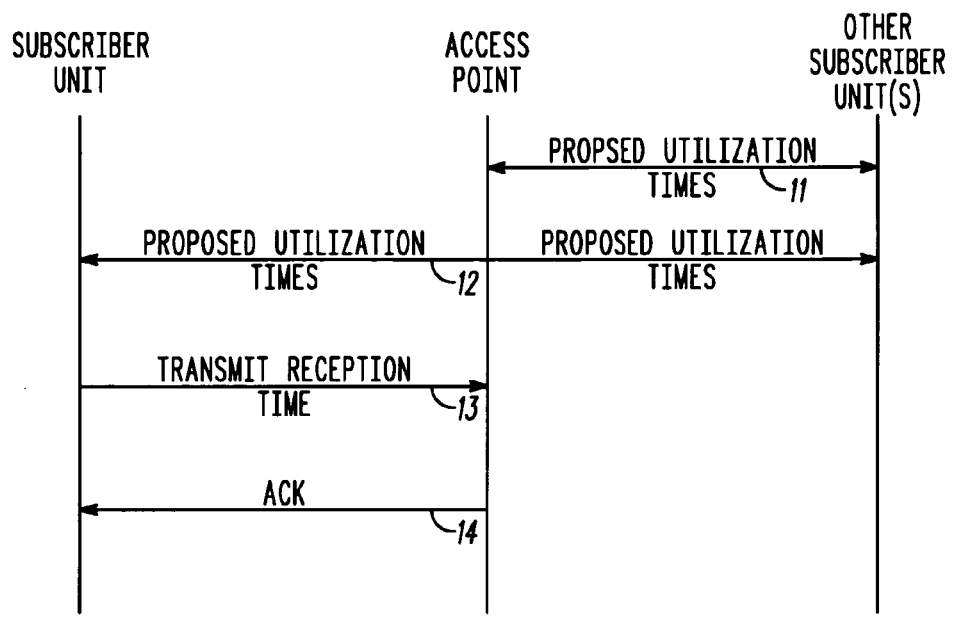
FIG. 1 comprises a signaling diagram as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a subscriber unit can select a time to receive transmissions from a wireless local area network access point using a shared wireless communication resource, at least in part, by receiving a beacon transmission from the access point comprising first information that corresponds to times when other subscriber units are proposing to utilize the shared wireless communication resource and then using the first information to select a particular time to monitor the shared wireless communication resource for access point transmissions intended for the subscriber unit.

For example, the subscriber unit may wish to monitor for such transmissions at a particular time when the subscriber unit will emerge from a sleep mode of operation. By providing appropriate information in a beacon transmission, the access point can provide information to facilitate selection by the subscriber unit of a reception time that is less likely to collide with usage by other subscriber units and thereby decentralize and distribute the reception scheduling process. This, in turn, relieves the access point of the computational and resource burden of administering such scheduling while further typically better accommodating, overall, the power saving activities of the subscriber units.

So configured, and pursuant to a preferred embodiment, an access point can receive transmissions from a plurality of subscriber units, which transmissions include information that corresponds to proposed utilization times for many of the various subscriber units (for example, in an 802.11-compliant embodiment, only those subscriber units that wish to schedule a subsequent transmission will typically be sourcing such a transmission at this point in the protocol). At least some of that received information can then be combined into a message (or otherwise used to inform the content of the message), which message can be transmitted to the relevant pool of subscriber units (such a transmission can occur, for example, as part of a beacon transmission).

Various subscriber units (and particularly those that have not already proposed a utilization time) can then use the information in such a received message to select a first particular time at which to shift from a sleep mode of operation to an active mode of operation and to select a second, later particular time at which to monitor the shared wireless communication resource for transmissions from the access point specifically for the attention of the subscriber unit. As will be shown below in more detail, such an approach can be particularly beneficial when applied within an 802.11 context, but it will be readily understood by those skilled in the art that these teachings can be readily applied elsewhere as well.

Referring now to the drawings, and in particular to FIG. 1, when the shared wireless communications resource comprises an 802.11 compliant resource, in a regular periodic fashion the subscriber units will have an opportunity to transmit a message 11 to an access point that includes at least their relative proposed utilization times (this opportunity affords, on a regular and periodic basis, a mechanism whereby a given subscriber unit can arrange for an opportunity to schedule a time at which the subscriber unit can transmit a message containing bearer content such as vocoded speech or a data file as is well understood in the art).

Pursuant to a preferred embodiment, the access point transmits (preferably as part of a regularly scheduled beacon transmission as per, for example, the 802.11 protocol) a message 12 that includes information that identifies and includes all of the access times as proposed by each of the various subscriber units. As an alternative approach, the message 12 can instead identify specific times when none of the various subscriber units has indicated that they will be utilizing the communication resource. Or, as yet another alternative, all potential utilization times can be accounted for via such a message 12 with an appropriate corresponding characterization regarding intended utilization or non-utilization by any of the subscriber units.

A given subscriber unit (and particularly one that has not already presented a proposed utilization time to the access point as per the above process) can then process such information to facilitate determining, by that subscriber unit, a particular subsequent time at which that given subscriber unit will monitor the communication resource for transmissions from the access point (and, more particularly, a corresponding time at which the given subscriber unit can awaken from a sleep mode of operation to effect such reception monitoring). The given subscriber unit can then transmit a message 13 to the access point that includes this reception time information, In a preferred embodiment, the access point would then respond with an acknowledgement message 14 to confirm receipt of the previous transmission from the subscriber unit.

So configured, and as will be related in more detail below, such a procedure permits a subscriber unit to select a reception opportunity in a remote and distributed fashion with respect to the access point. In particular, the access point need only report timely scheduling information as provided to it by other subscriber units. If desired, the access point need not dedicate any resources or computational capacity to determining what the schedule should be, as versus what the schedule presently appears to be. Notwithstanding this distributed approach, over a useful range of operating conditions this mechanism will serve to permit relatively quiescent subscriber units to both be able to likely timely receive their access point transmissions while also being able to effect a useful degree of power saving.

Figure 2:
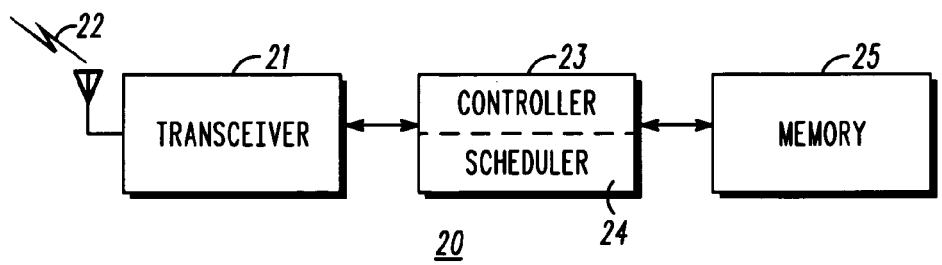
FIG. 2 comprises a block diagram as configured in accordance with an embodiment of the invention.

Referring now to FIG. 2, various subscriber units can potentially benefit from the teachings set forth herein. In general, however, such a subscriber unit 20 will typically include a transceiver 21 comprising a wireless transceiver 21 that can both receive and transmit using a shared wireless communication resource 22 (including but not limited to resources such as radio frequency carriers, optical carriers, ultra sonic carriers, and so forth). Though various systems and protocols can similarly benefit from the approaches set forth herein, in a preferred embodiment the resource will comprise an 802.11 compliant shared wireless communication resource.

The transceiver 21 operably couples to a controller. Such a controller can be comprised of a fixed-purpose or a programmable (or partially programmable) platform as is well understood in the art and may comprise a distributed or a highly integrated controller architecture as desired and as may be appropriate to the needs and requirements of a given application. In a preferred embodiment the controller 23 has (or can otherwise effect) at least an active mode of operation and a sleep mode of operation (with respect to itself, the transceiver 21, and/or other components, elements, or processes that comprise a given subscriber unit). Such sleep modes of operation are well understood in the art and typically comprise an operational state when certain power-consuming components and/or processes are fully or partially shut down to thereby effect a reduction in power usage as compared to a normal active mode of operation. These teachings are generally useful with a wide variety of sleep modes of operation. Since such sleep modes of operation are well understood in the art, no further description of such modes of operation will be provided here for the sake of brevity and the preservation of focus.

In a preferred embodiment, the subscriber unit 20, and particularly the controller 23, will further include a scheduler 24. Such a scheduler 24 can serve to use the schedule information (such as a plurality of utilization times as earlier proposed by various subscriber units) to select a subsequent wake-up time, a subsequent reception time, or preferably both. Such a scheduler 24 can also serve, for example, to essentially reschedule a subsequent wake-up time and/or a subsequent monitoring time when, for example, a conflict exists with respect to the originally selected first and second scheduled times.

A subscriber unit 20 will also preferably comprise a memory 25 (such as an appropriate volatile or non-volatile memory platform or platforms) that operably couples to the controller 23 (and/or the scheduler 24). Such a memory 25 can store, at least from time to time as appropriate to the availability of and the need for the information, information such as the plurality of proposed times at which other subscriber units have proposed to utilize the shared wireless communication resource (or such other scheduling information as the access point may have provided), a first scheduled time as determined by the subscriber unit 20 at which time the controller 23 will shift from a reduced power mode of operation to an active mode of operation, and a second scheduled time (typically near but subsequent to the first scheduled time) as determined by the subscriber unit 20 at which time the controller 23 will cause the transceiver 21 to receive data as is then being possibly transmitted by the access point. By retaining such information as received by the subscriber unit 20 or determined thereby in such a memory 25, the subscriber unit 20 will have ready access to the data and/or operational parameters that will facilitate these processes.

As noted above, pursuant to a preferred approach, subscriber units that have information to convey to an access point will transmit their proposed utilization times to the access point. In an 802.11 implementation, for example, such information is transmitted by the subscriber units during the contention portion of a periodic beacon interval. In a preferred embodiment, such subscriber units would then be available to receive any transmissions that the access point may have for such subscriber units at a time that corresponds to the subscriber unit proposed time. Subscriber units that have no information to so convey, however, may nevertheless have an interest or need to receive information when and as the access point has such data to forward. Pursuant to these embodiments such a subscriber unit will be able to generally receive such information in a timely fashion while simultaneously achieving considerable power consumption efficiencies.

Figure 3:
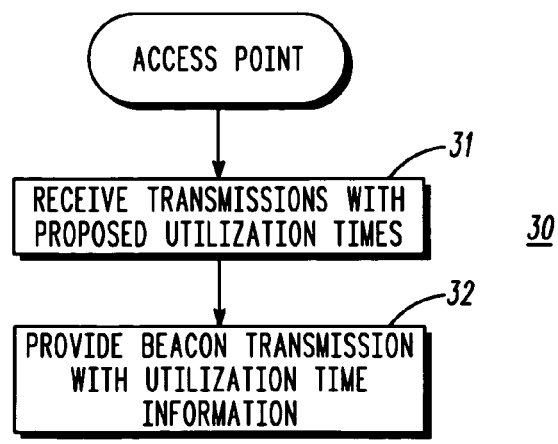
FIG. 3 comprises a flow diagram for an access point as configured in accordance with an embodiment of the invention.

Referring now to FIG. 3, pursuant to the described process 30, the access point receives transmissions 31 from various subscriber units that include resource utilization times as proposed by those subscriber units (which information can comprise, for example, Automatic Power Save Delivery (APSD) information). Such information will preferably include information that will identify the proposed wake-up times when each of the transmitting subscriber units propose to exit from a sleep mode to receive and/or send data from or to the access point using the shared resource. The access point then provides 32 a transmission (such as, preferably, a beacon transmission) that includes such utilization time information. Such scheduling information will preferably comprise the actual times at which various of the subscriber units will be utilizing the shared resource.

Other approaches are possible, of course. As noted earlier, this message can specifically indicate those temporal opportunities that are presently available to support the desired reception monitoring activity. The schedule information itself can be in any suitable form as comports with the temporal (or other) structure of the protocol in question. For example, the schedule information can identify a specific time or times when other subscriber units are expected to make a transmission. Such a specific time can comprise a particular moment in a real-time sequence or, for example, a value that corresponds to a time slot or a value that corresponds to a time slot as measured with respect to some particular known event (such as a beacon transmission or the beginning or ending of a particular marked frame of information).

So configured, it will be appreciated that the computational requirements for the access point are relatively minimal. The access point, in general, simply serves to receive information from the subscriber units and to then report that information in a subsequent beacon (or other) transmission. There is no requirement that the access point attempt to identify potential conflicts or collisions or to otherwise serve to actively mitigate or alleviate such operational conditions. Instead, the subscriber unit is itself empowered to address such concerns.

Figure 4:
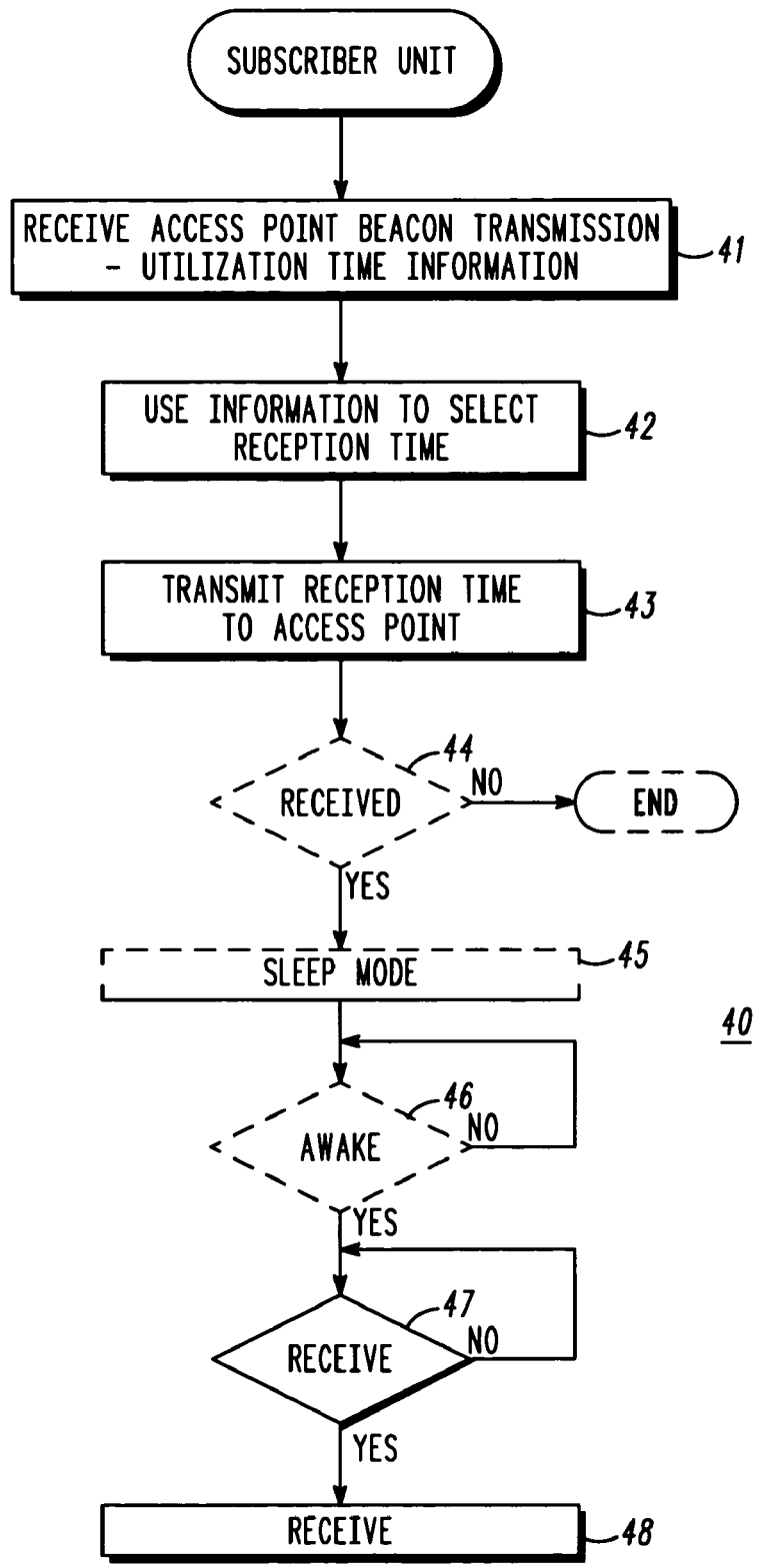
FIG. 4 comprises a flow diagram for a subscriber unit as configured in accordance with various embodiments of the invention.

Referring now to FIG. 4, pursuant to a preferred subscriber unit process 40, a given subscriber unit will receive 41 the access point beacon transmissions described above that include or otherwise reflects the utilization time information for other subscriber units. The subscriber unit then uses 42 that information to select a reception time for itself.

Those skilled in the art will recognize that various approaches can be taken to facilitate such a selection. The selection mechanism can be relatively static or fully or partially dynamic as may best suit the needs of a given application. For example, some subscriber units may simply select a first available temporal opportunity while other subscriber units may always select a second, a third, or a last temporal opportunity as may be available. As another example, a subscriber unit can derive a random (or, more typically, a pseudo-random) value and then use that value to facilitate selection of a particular temporal opportunity. An approach such as the latter has the potential benefit of aiding in avoiding a situation where two or more subscriber units autonomously select an identical temporal opportunity. As a specific example of the latter, and where the beacon transmission includes a number representing the number of active subscriber units that share a given shared resource, a given subscriber unit can select a time slot by selecting a value Z that corresponds to a specific time slot, where:

$$Z = Y \bmod N$$

where Y is a random integer between 1 and X (where X is the number of active subscriber units being supported by a given resource) and where N is the number of available time slots (for example, where N would represent the number of empty time slots during the beacon period of the 802.11 protocol). Such approaches will likely not eliminate all collisions but will frequently help considerably to reduce the chance of such occurrences (and especially when there are a large number of active stations being supported).

The subscriber unit will then convey that selected reception time via a transmission 43 to the access point. For example, when implemented in an 802.11 compliant system, such a transmission can be conveyed when an opportunity to transmit short messages regularly presents itself during a corresponding contention window. In an optional embodiment, the subscriber unit can then determine 44 whether the access point received that earlier transmission (for example, by detecting reception of an acknowledgement signal within a predetermined time of having transmitted the reception time message to the access point).

One significant benefit accorded by such a process 40 is that the subscriber unit now knows with some certainty that no transmissions will be sourced by the access point for intended reception by the subscriber unit until the selected reception time. Accordingly, in a preferred embodiment, the subscriber unit can now enter a sleep mode 45 of operation. Such a sleep mode can be relatively modest (where only one or a few components or processes are powered down) or relatively complete (as where the entire subscriber unit essentially powers down save for a timer mechanism that serves to eventually awaken the device at the predetermined time). Regardless of the amount of power savings gained, at least some savings can be reliably attained without likely missing a transmission from the access point.

Upon determining 46 that the subscriber unit should be awakened and returned to an active mode of operation, the process 40 can then determine 47 whether it is also now time to begin monitoring the shared resource for an access point transmission to the subscriber unit. When the appointed time arrives, and presuming that the access point indeed has content to transmit to the subscriber unit, the subscriber unit can then receive 48 the transmitted information.

Upon receiving such a transmission, of course, other actions as appropriate can be taken as well understood in the art. Such actions can include, for example, institution of a sleep mode of operation to again conserve power.

As already acknowledged earlier, it is possible that the time selected by a given subscriber unit to receive a transmission from the access point will coincide with the time as selected by another subscriber unit using this or another process. There are various options that may be considered to accommodate such an occurrence. As one example, the subscriber unit can simply redo the described process. As another example, the subscriber unit may redo the described process albeit with one or more intentional differences being made to attempt to distance the selected temporal opportunity from one that a competing subscriber unit might select (such as by utilizing a different random number or random number selection process). As another example, the subscriber unit can forgo a power-saving mode of operation and simply remain active to ensure availability for if and when the access point may transmit information to the subscriber unit. Other possible courses of action are available as well.

Such embodiments permit a shared resource system to facilitate reliable communications amongst a plurality of subscriber units while also accommodating significant power savings for at least some subscriber units and without necessitating an overly complex scheduling overhead requirement for the access point. Such an approach can provide benefits when applied in a variety of contexts but has clear applicability in an 802.11 compliant system.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, when implemented in an 802.11 compliant system, the inclusion of the scheduling information in the beacon transmission will likely add additional overhead to the beacon frame. As one optional approach to address this instance, the access point can use low complexity lossless bit coding (such as run-length coding) before committing the bits to the beacon frame.

We claim:

1. A method for use by a subscriber unit to select a time to receive a transmission from a wireless local area network access point using a shared wireless communication resource, comprising:

receiving a beacon transmission from the access point comprising first information that corresponds to times when other subscriber units are proposing to utilize the shared wireless communication resource, wherein receiving a beacon transmission comprises receiving the beacon transmission at a scheduled time;

using the first information to select a particular time to receive data from the access point using the shared wireless communication resource;

transmitting the selected particular time;

determining that the transmission at the selected particular time was not received by the access point; and selecting a new time to permit reception of data from the access point using the shared wireless communication resource including:

receiving another beacon transmission from the access point comprising second information that corresponds to times when other subscriber units are proposing to utilize the shared wireless communication resource; and using the second information to select a new particular time to receive data from the access point using the shared wireless communication resource.

2. The method of claim 1 wherein receiving the beacon transmission at a scheduled time further comprises altering a subscriber unit operating mode from a sleep mode of operation to an active reception mode of operation.

3. The method of claim 1 wherein using the first information to select a particular time to receive data comprises scheduling a subscriber unit sleep mode of operation to permit reception of data at the selected particular time.

4. The method of claim 1 wherein the shared wireless communication resource comprises an 802.11 compliant shared wireless communication resource.

5. A subscriber unit for use with a wireless local area network access point using a shared wireless communication resource, comprising:

a shared wireless communication resource compatible transceiver;

a controller having at least an active mode of operation and a sleep mode of operation and being operably coupled to the transceiver;

a memory operably coupled to the controller having, at least from time to time, stored therein:

a plurality of proposed times received from the access point at which other subscriber units have proposed to utilize the shared wireless communication resource, wherein the proposed times are part of a regularly scheduled beacon transmission from the access point;

a first scheduled time at which the controller will shift from the sleep mode of operation to the active mode of operation;

a second scheduled time at which the controller will cause the transceiver to receive data as transmitted by the access point;

wherein the controller comprises scheduling means for using the plurality of proposed times to select the first and second scheduled times, for causing transmission of the data to the access point at the second scheduled time when there is no proposed time, and for further selecting another scheduled time when an apparent conflict appears to exist with another subscriber unit at the second scheduled time.

* * * * *